(12) United States Patent
Lunin et al.

(10) Patent No.: US 8,118,958 B2
(45) Date of Patent: Feb. 21, 2012

(54) COMPOSITE RING GEAR WITH METALLIC GEAR INSERT, AND METHOD OF FORMING SAME

(75) Inventors: Stepan V. Lunin, Irvine, CA (US); Lotfi El-Bayoumy, Vorba Linda, CA (US)

(73) Assignee: Moog Inc., East Aurora, NY (US)

( * ) Notice: Subject to any disclaimer, the term of this patent is extended or adjusted under 35 U.S.C. 154(b) by 1253 days.

(21) Appl. No.: 11/796,318

(22) Filed: Apr. 27, 2007
(Under 37 CFR 1.47)

(65) Prior Publication Data
US 2009/0282938 A1 Nov. 19, 2009

Related U.S. Application Data

(60) Provisional application No. 60/795,764, filed on Apr. 28, 2006.

(51) Int. Cl.
*B32B 37/00* (2006.01)

(52) U.S. Cl. ........ 156/169; 156/172; 156/173; 156/175; 29/893; 29/893.2; 29/893.37

(58) Field of Classification Search ........... 156/169, 156/172, 173, 175; 29/893, 893.2, 37
See application file for complete search history.

(56) References Cited

U.S. PATENT DOCUMENTS

| 4,137,354 | A  | * | 1/1979 | Mayes et al. | 428/116 |
|---|---|---|---|---|---|
| 5,435,869 | A  | * | 7/1995 | Christensen | 156/175 |
| 5,497,548 | A  | * | 3/1996 | Schlenger et al. | 29/893 |
| 5,578,154 | A  | * | 11/1996 | Britten | 156/172 |
| 5,632,940 | A  | * | 5/1997 | Whatley | 264/46.4 |
| 6,874,231 | B2 | * | 4/2005 | Kobayashi et al. | 29/893.1 |
| 7,090,737 | B2 | * | 8/2006 | Lindenau | 156/173 |

FOREIGN PATENT DOCUMENTS

WO WO-01/64570 A1 * 9/2001

* cited by examiner

*Primary Examiner* — Jeff Aftergut
(74) *Attorney, Agent, or Firm* — Phillips Lytle LLP

(57) ABSTRACT

A composite ring gear (10) with a metallic gear insert (30) has at least one filament (34) wound about the gear insert and an eyelet (32) a plurality of times. The filament is adapted to withstand a portion of a tensile load transmitted between the insert and the eyelet. The insert, eyelet and filament are then embedded in a composite material.

1 Claim, 2 Drawing Sheets

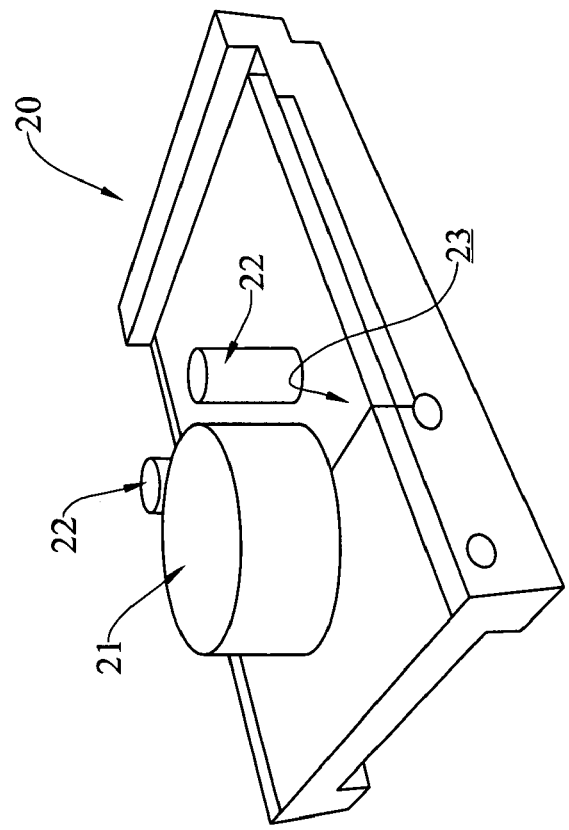
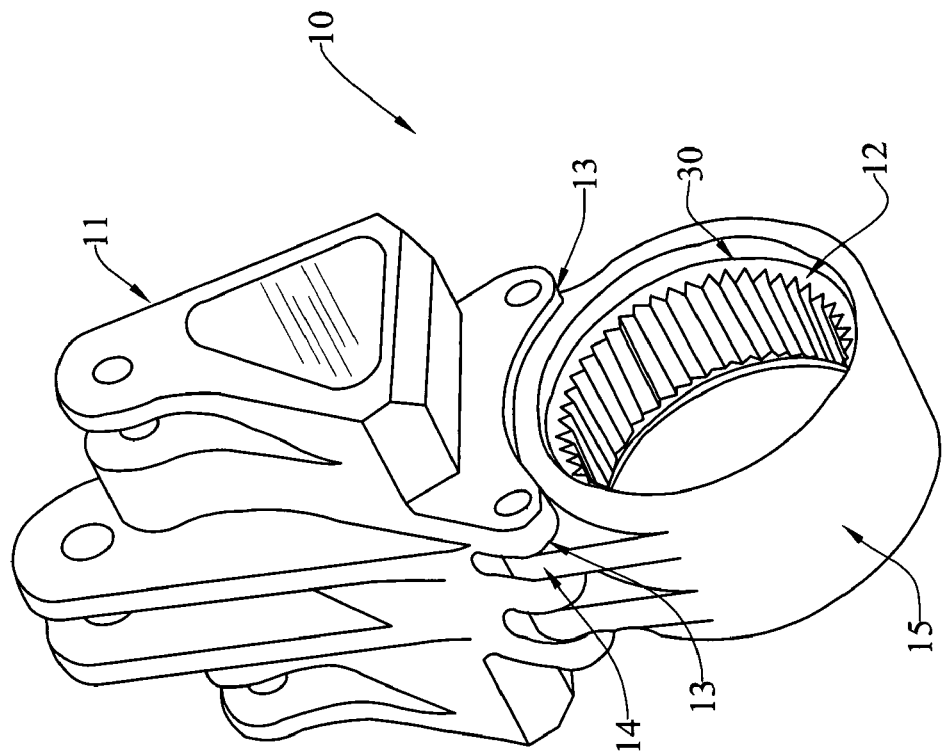
Fig. 1
Fig. 2

COMPOSITE RING GEAR WITH METALLIC GEAR INSERT, AND METHOD OF FORMING SAME

CROSS REFERENCE TO RELATED APPLICATIONS

The present application claims the benefit of domestic priority on provisional patent application Ser. No. 60/795,764, filed Apr. 28, 2006.

TECHNICAL FIELD

The present invention relates generally to gear assemblies, and, more particularly, to improved composite gear assemblies, such as ring gears, having a metallic gear insert, and to methods of forming same.

BACKGROUND ART

In a planetary gear train, a sun gear is surrounded by a plurality of planet gears. The planet gears matingly engage an outer ring gear that encircles the planets.

The outer ring gear is an expensive part to manufacture. Moreover, it is commonly formed of a suitable metal, which contributes unnecessarily to its relatively high weight.

In some applications, such as on an aircraft, weight is at a premium, and steps must be taken to avoid the introduction of undue weight wherever necessary.

DISCLOSURE OF THE INVENTION

With parenthetical reference to the corresponding parts, portions or surfaces of the disclosed embodiment, merely for purposes of illustration and not by way of limitation, the invention provides an improved composite ring gear with a metallic gear insert.

More particularly, in one aspect, the invention provides an improved gear assembly (10), which broadly comprises: a gear insert (30); at least one eyelet (32); at least one filament (34) wound around the insert and eyelet a plurality of times and adapted to withstand a portion of a tensile load transmitted between the insert and eyelet; the insert, eyelet and filament being embedded in a composite material.

In the preferred embodiment, the gear assembly is a ring gear, and the filament is selected from the group consisting of carbon, fiberglass and aramid. The filament is preferably wound in tension about the insert and the eyelet.

The invention may further include an interlock between the insert and the composite material to prevent relative rotation therebetween.

In another aspect, the invention provides an improved method of forming a gear assembly, which broadly comprises the steps of: providing a fixture (20); providing a gear insert (30); positioning the gear insert on the fixture; providing an eyelet (32 or 33); positioning the eyelet on the fixture; winding a filament (34) about the insert and eyelet a plurality of times, the filament being adapted to withstand a portion of a tensile load transmitted between the insert and eyelet; embedding the insert, eyelet and filament in a resin to form a gear assembly; curing the resin; and removing the gear assembly from the fixture.

In still another aspect, the invention provides an improved method of forming a gear assembly, which broadly comprises the steps of: providing a fixture; providing first and second eyelets; positioning the eyelets on the fixture; winding a filament about the eyelets a plurality of times, the filament being adapted to withstand a portion of a tensile load transmitted between the eyelets; embedding the eyelets and the filament in a resin; curing the resin to form an assembly; removing the assembly from the fixture; providing a gear; and pressfitting the gear into one of the eyelets; thereby to form a gear assembly.

Accordingly, the general object of the invention is to provide improved gear assemblies.

Another object is to provide an improved composite ring gear having a metallic gear insert.

Still another object is to provide a method of performing a composite ring gear with metallic gear teeth, and with embedded internal filamentary wound windings that function to absorb much of the stress attributable to a load transmitted between an eyelet and the gear.

These and other objects and advantages will become apparent from the foregoing and ongoing written specification, the drawings, and the appended claims.

BRIEF DESCRIPTION OF THE DRAWINGS

FIG. 1 is perspective view showing the improved composite ring gear provided with a metallic insert.

FIG. 2 is a perspective view of the fixture for forming the improved gear.

DESCRIPTION OF THE PREFERRED EMBODIMENTS

Figure 3:
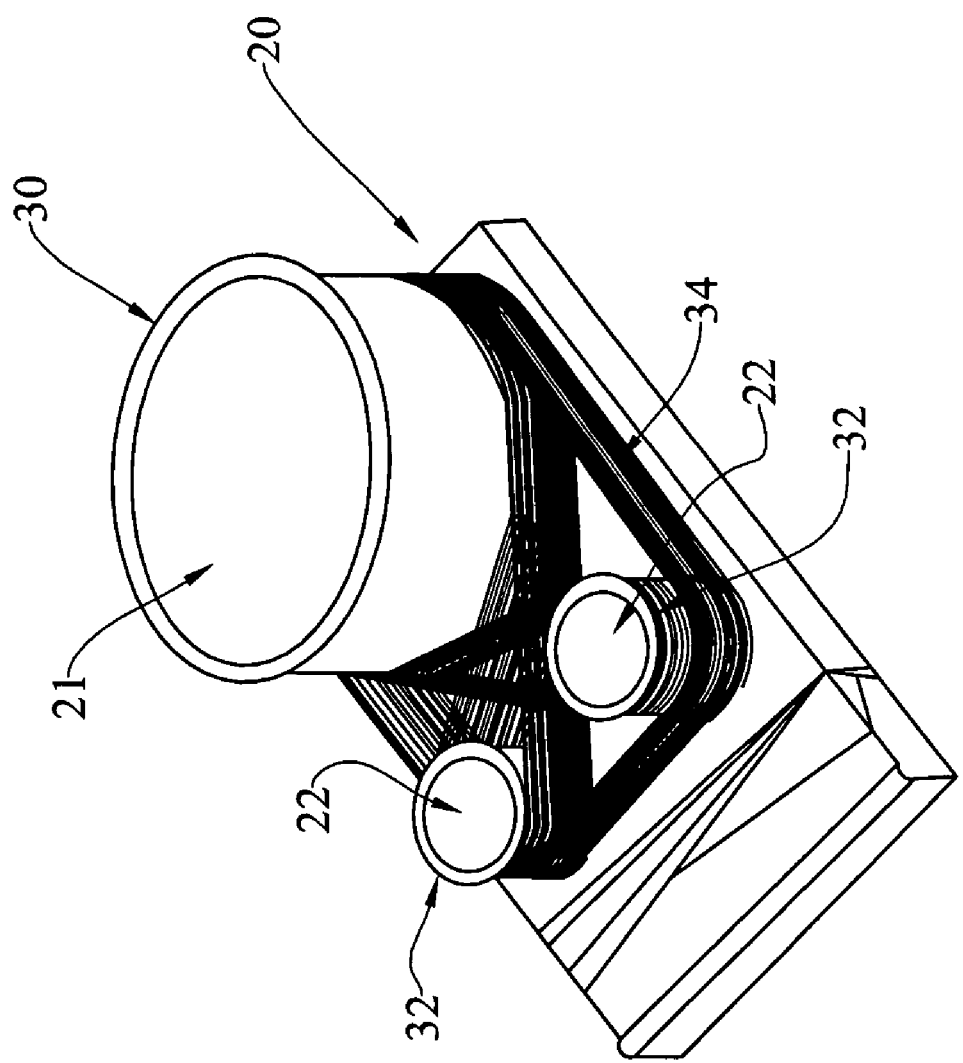
FIG. 3 is a view of the fixture shown in FIG. 2, albeit reversed as to position, and showing the filament windings as being wound around the ring gear and two eyelets.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting now to the drawings, and, more particularly to FIG. 1 thereof, the present invention broadly provides an improved gear assembly. More particularly, the invention provides an improved composite ring gear with a metallic gear insert, and to an improved method of forming same.

The improved ring gear assembly, as formed, is indicated at 10 in FIG. 1. Gear assembly 10 is shown in association with other structure, collectively indicated at 11. This other structure forms no part of the present invention, and therefore need not be described. The improved ring gear 10 is shown as broadly including a metallic gear insert 12, a pair of eyelets 13, 13 arranged in ears 14, 14 extending outwardly from a plastic or composite body 15.

FIG. 2 is perspective view of a fixture for manufacturing the improved ring gear. This fixture, generally indicated at 20, is shown as broadly including a central cylindrical member 21, and two dowel-like members, severally indicated at 22 arranged in close proximity to the central member 21. All three members, 21, 22, 22, extend upwardly from a horizontal surface 23 on the fixture.

Referring now to FIG. 3, a metallic gear insert, generally indicated at 30, is first slipped over large-diameter locating cylinder 21. This metallic insert has, in one form, an outer cylindrical surface, and a toothed inner surface. Two eyelets, severally indicated at 32, are slipped over upstanding dowels 22, 22. These eyelets are in the form of thin-walled cylinders.

Thereafter, a filament is wound about the insert and the eyelets a plurality of times. In FIG. 3, the filament is collectively indicated at 34. It will be noted that the filament is wound in a manner somewhat analogous to a drum and capstan. This filament may be formed of a suitable material, such as carbon, fiberglass, aramid and the like. Preferably, the filament is wound about the eyelets and gear insert while the filament is in tension. The filament is adapted to carry most of the tensile load between the eyelets and the gear.

Thereafter, a surrounding form (not shown) is placed is about the structure shown in FIG. 3, and the form is then filled with a suitable plastic or composite resin material. In other words, the eyelets, the gear insert and filaments are all embedded in the composite material.

Thereafter, the resin is permitted to cure to form a gear assembly. After the resin is cured, the gear assembly is removed from the fixture, and is then available for use.

In one unique form, the gear assembly is replaced by another eyelet. After the gear assembly is formed, a metallic gear insert is then press fitted into this large-diameter form. In any of the forms indicated, an interlock may be provided between the outer surface of the insert and the composite material to prevent relative rotation therebetween. This interlock may simply comprise a form of serrations, or some other interlock means, to prevent relative rotation between the cast gear, and the metallic insert.

Thus, the invention provides an improved gear assembly. In the form shown, that gear assembly may be in the form of a ring gear having a metallic insert embedded within a composite body. Since the composite materially is relatively weak, the fibers are wound about the insert and the eyelets to absorb and carry much of the tensile stress between the gear insert and the eyelets, much like rebar in concrete.

MODIFICATIONS

The present invention expressly contemplates that many changes and modifications may be made. For example, the particular form of the gear assembly is readily modifiable. While the invention may lend itself to the manufacture of ring gears and ring gear assemblies. Other type of geared mechanisms may be formed as well. There may be one, two or more eyelets or other structure embedded in the body. The filament is preferably a suitable carbon fiber, but may be a fiberglass, an aramid, or some other composition as well. In general, the strength of the gear assembly in the sense of resistance to tensile loads, will increase with the number of windings. Accordingly, it is generally to be expected that the strength of the gear assembly will be proportional to the number of windings of the filament.

The filament may be of the same material, or may be of multiple materials. Preferably, the filament is continuous, and is simply wound in the pattern illustrated to provide force bearing strength generally along the load paths between the interconnected structures.

As indicated above, the particular form of the gear assembly may be changed. There may be one or more eyelets, or other island-like structure about which the filaments are wound. Preferably, the filaments are maintained in tension when wound, and when embedded.

Accordingly, while the presently-preferred form of the improved gear assembly has been shown and described, and several modifications thereof discussed, persons skilled in this art will readily appreciate that various additional changes and modifications may be made without departing from the spirit of the invention, as defined and differentiated by the following claims.

What is claimed is:

1. The method of forming a gear assembly, comprising the steps of:
   providing a fixture;
   providing first and second eyelets;
   positioning said eyelets on said fixture;
   winding a filament about said eyelets a plurality of times, said filament being adapted to withstand a portion of a tensile load transmitted between said eyelets;
   embedding said eyelets and said filament in a resin;
   curing said resin to form an assembly;
   removing said assembly from said fixture;
   providing a gear; and
   press-fitting said gear into one of said eyelets;
   thereby to form a gear assembly.

* * * * *